(12) United States Patent
Li et al.

(10) Patent No.: US 11,260,345 B2
(45) Date of Patent: Mar. 1, 2022

(54) HIGH-EFFICIENCY DESICCANT WHEEL

(71) Applicant: Institute of Nuclear Energy Research, Atomic Energy Council, Executive Yuan, R.O.C., Taoyuan (TW)

(72) Inventors: Heng Yi Li, Taoyuan (TW); Tsair-Fuh Huang, Taoyuan (TW); Sheng-Fu Yang, Taoyuan (TW); Po-Hsiu Kuo, Taoyuan (TW); Yu-Ren Chen, Changhua County (TW); How-Ming Lee, Taoyuan (TW); To-Mei Wang, Taoyuan (TW)

(73) Assignee: Institute of Nuclear Energy Research, Atomic Energy Council, Executive Yuan, R.O.C., Taoyuan (TW)

( * ) Notice: Subject to any disclaimer, the term of this patent is extended or adjusted under 35 U.S.C. 154(b) by 291 days.

(21) Appl. No.: 16/709,960

(22) Filed: Dec. 11, 2019

(65) Prior Publication Data
US 2021/0178319 A1  Jun. 17, 2021

(51) Int. Cl.
*B01D 53/06* (2006.01)
*B01D 53/26* (2006.01)
*F24F 3/14* (2006.01)

(52) U.S. Cl.
CPC ........... *B01D 53/261* (2013.01); *B01D 53/06* (2013.01); *F24F 3/1423* (2013.01);
(Continued)

(58) Field of Classification Search
CPC ............................ B01D 53/06; B01D 53/261; B01D 2253/342; B01D 2253/3425;
(Continued)

(56) References Cited

U.S. PATENT DOCUMENTS

| 2,807,258 A | * | 9/1957 | Pennington | ........... | F24F 3/1423 126/113 |
| 5,896,751 A | * | 4/1999 | Wakizaka | ............. | F24F 3/1423 62/271 |

(Continued)

FOREIGN PATENT DOCUMENTS

JP          2019-11210 A  *  1/2019

*Primary Examiner* — Frank M Lawrence, Jr.
(74) *Attorney, Agent, or Firm* — Demian K. Jackson; Jackson IPG PLLC

(57) ABSTRACT

A desiccant wheel is provided to be rotatable. Through the body of the wheel or a surface adsorbent, water vapor in humid air flow is adsorbed. By passing a high-temperature air flow through the wheel, the body or surface coating is regenerated with moisture removed. Along a cross-section radial, the wheel is divided into different areas. The body has three-dimensionally inter-connected pores. The pores can be of different types. The wheel is a complete concentric cylinder or a concentric cylinder comprising equal or unequal sectors. The equal or unequal sectors are separated with each other. The wheel can rotate at a fixed speed for continually repeating a process of adsorbing, transiting, and regenerating. Thereby, drying can be carried out without causing physical or chemical change to heat-sensitive material, which also improves drying efficiency, reduces size, lowers power consumption, and helps in carbon reduction for industry.

11 Claims, 6 Drawing Sheets

(52) U.S. Cl.
CPC .......... *B01D 2253/342* (2013.01); *B01D 2253/3425* (2013.01); *B01D 2257/80* (2013.01); *B01D 2259/4009* (2013.01); *F24F 2203/1032* (2013.01)

(58) Field of Classification Search
CPC ......... B01D 2257/80; B01D 2259/4009; F24F 3/1423; F24F 2203/1032
USPC ......... 96/125, 130, 144; 95/113; 34/80, 472, 34/473
See application file for complete search history.

(56) References Cited

U.S. PATENT DOCUMENTS

| | | | | |
|---|---|---|---|---|
| 5,938,523 | A * | 8/1999 | Khelifa | B60H 3/0633 |
| | | | | 454/156 |
| 6,568,100 | B1 * | 5/2003 | Fielding | B01D 53/0446 |
| | | | | 34/109 |
| 10,570,065 | B1 * | 2/2020 | Yang | C04B 35/111 |
| 2010/0175557 | A1 * | 7/2010 | Shih | B01D 53/0438 |
| | | | | 96/146 |
| 2013/0061756 | A1 * | 3/2013 | Hung | B01D 53/06 |
| | | | | 96/126 |
| 2014/0033916 | A1 * | 2/2014 | Harris | F24F 3/1429 |
| | | | | 95/10 |

* cited by examiner

HIGH-EFFICIENCY DESICCANT WHEEL

TECHNICAL FIELD OF THE INVENTION

The present invention relates to a desiccant wheel; more particularly, to provide a rotatable desiccant wheel, where the desiccant wheel has a body having three-dimensionally (3D) inter-connected pores or has a surface adsorbent to adsorb water vapor in humid air flow as passing through the desiccant wheel; and, in the meantime, by passing another high-temperature air flow through the desiccant wheel, the body or surface coating of the desiccant wheel is regenerated with moisture removed.

DESCRIPTION OF THE RELATED ARTS

Agriculture and food industries are all around the world. To preserve the nutrition, flavor, and appearance of the agricultural products or foodstuffs, drying quality is a key point. Nevertheless, the drying process is also essential in the manufacturing procedures for pharmaceuticals, materials, plastics, semiconductors, and electronics.

As compared to North America and Europe, some places have hot and humid climate so that the residents, businesses, and industries need dehumidifying and drying utilities. Even most American families have dehumidifying appliances, and the purpose is to exchange out a fresh dry air for dehumidification.

Existing patents related to the structures of desiccant wheels are not much. Known from the patents and products of desiccant wheel, conventional techniques have the following disadvantages:

1. The channels of air flow for process or flow of regenerated air are straight through in the desiccant wheel. The contact area between the air flow and the adsorbent on channel surface is limited. It is not easy for the adsorbent to adsorb water vapor in the air flow; or, the adsorbent is not easy to be desorbed by the regenerated air flow.

2. Currently, the regenerated air of the desiccant wheel has in general a high temperature, where 100 degrees Celsius (° C.) at least is required. Hence, the air heating process is very energy-intensive; and the components contacting with the hot air may be easily damaged.

3. The adsorbent and the metal substrate of the desiccant wheel are bound by using a binder, which may be easily fallen apart after a long-term use.

4. Another desiccant wheel as a composite of an adsorbent and a ceramic fiber is revealed, yet, it cannot resist abrasion and collision.

Hence, the prior arts do not fulfill all users' requests on actual use.

SUMMARY OF THE INVENTION

The main purpose of the present invention is to provide a body of a desiccant wheel with a structure of 3D inter-connected pores, where the desiccant wheel is assembled into a whole module with coordinated components to be attached to a drying equipment for application, especially for drying heat-sensitive material, without physical or chemical change; and the present invention further improves drying efficiency, reduces size, lowers power consumption, and helps in carbon reduction for industry.

Another purpose of the present invention is to provide a desiccant wheel with a structure of 3D inter-connected pores, for solving the problems of conventional desiccant wheel and achieving the following advantages: 1. the flow channels of the desiccant wheel are not straight lines, so that the contact areas for air flows are large; 2. the air for regenerating the desiccant wheel has a low temperature, below 80° C., so that energy efficient is very high and lives of components are long; 3. the body of the desiccant wheel adsorbs water, so that the dropping of adsorbent does not happen; and 4. the body of the desiccant wheel is robust and resistant to abrasion and collision.

To achieve the above purposes, the present invention is a device of high-efficiency desiccant wheel, comprising a shell body and a desiccant wheel, where the shell body has an upper cover and a lower cover; the upper cover has a high-temperature dry air inlet and a dry air outlet; the lower cover has a low-temperature humid air inlet, a low-temperature humid air outlet, and a high-temperature humid air outlet; the desiccant wheel has a body of concentric cylinder, and a structure of pores three-dimensionally inter-connected; the desiccant wheel has an end at the upper cover and another end at the lower cover; along a cross-section radial, the desiccant wheel is divided into an adsorption area, a transition area, and a dewater area; the lower cover has three ends each of which has a screw; the screw is inserted into the upper cover and is fixed by fastening nuts, springs, and washers at two ends of the screw; the desiccant wheel is driven by a motor to rotate at a fixed speed and is connected with the shell body through tubes; after a low-temperature humid air flow enters into the adsorption area through the low-temperature humid air inlet to adsorb water vapor to obtain a dry air flow, the dry air flow is outputted through the dry air outlet; then, after a portion of the dry air flow is shunted at the upper cover to enter into the transition area to desorb a portion of water on the desiccant wheel to obtain a low-temperature humid air flow, the low-temperature humid air flow is outputted from the low-temperature humid air outlet; then, a high-temperature dry air flow enters into the dewater area through the high-temperature dry air inlet to desorb most portion of water on the desiccant wheel to obtain a high-temperature humid air flow; then, the high-temperature humid air flow is outputted through the high-temperature humid air outlet; and the desiccant wheel thus rotates at the fixed speed to continually repeat a process of adsorbing, transiting, and regenerating. Accordingly, a novel device of high-efficiency desiccant wheel is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

Figure 1:
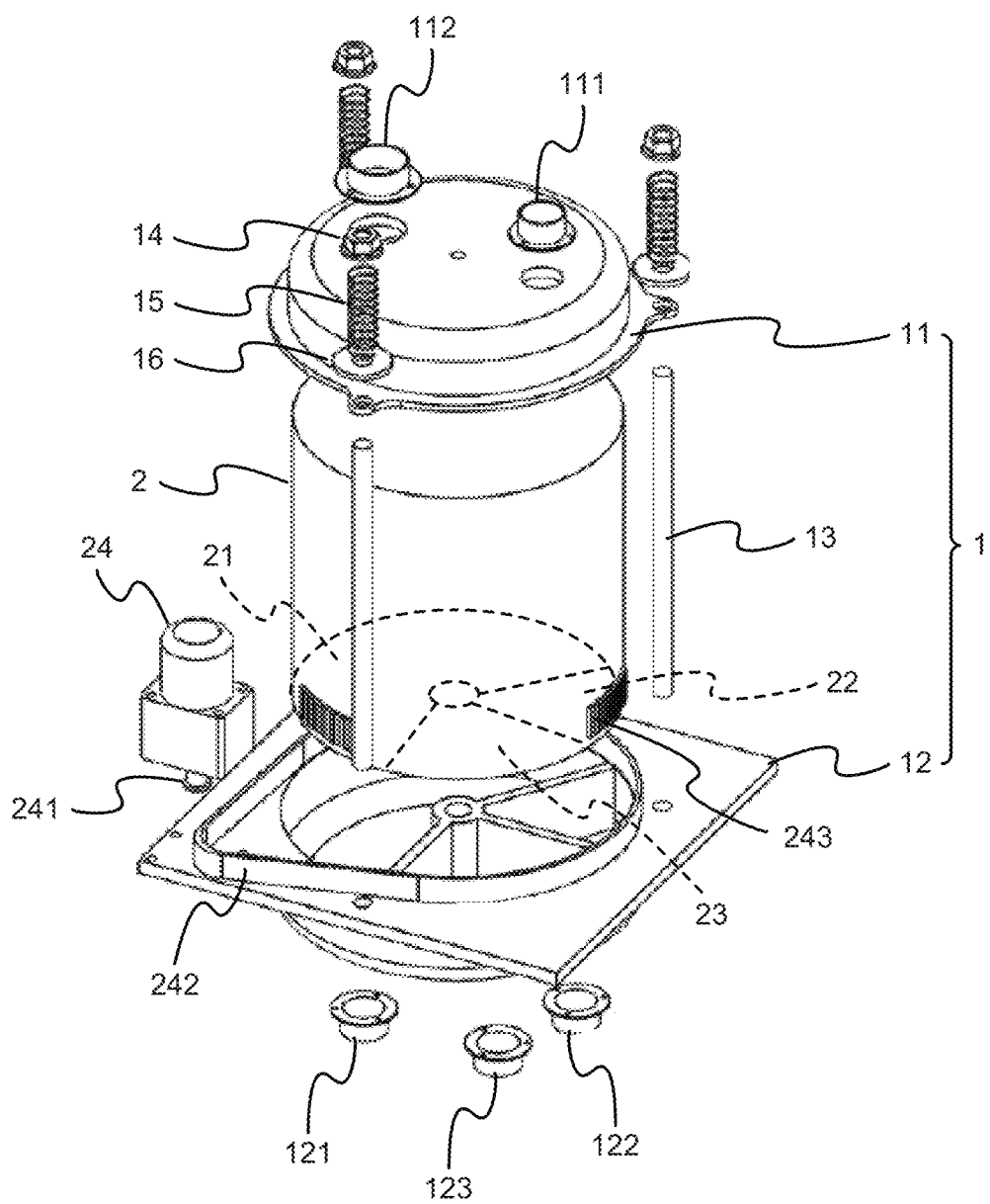
FIG. 1 is the view showing the preferred embodiment according to the present invention.

The following description of the preferred embodiment is provided to understand the features and the structures of the present invention.

Please refer to FIG. 1 to FIG. 6, which are a view showing a preferred embodiment according to the present invention; a view showing shapes of pores; a view showing a complete concentric cylinder; a view showing a concentric cylinder comprising equal sectors; a view showing a concentric cylinder comprising unequal sectors; and a view showing an application. As shown in the figures, the present invention is a device of high-efficiency desiccant wheel, comprising a shell body 1 and a desiccant wheel 2.

The shell body 1 comprises an upper cover 11 and a lower cover 12. The upper cover 11 has a high-temperature dry air inlet 111 and a dry air outlet 112; and the lower cover has a low-temperature humid air inlet 121, a low-temperature humid air outlet 122, and a high-temperature humid air outlet 123.

The desiccant wheel 2 has a body of concentric cylinder with a structure of three-dimensionally (3D) inter-connected pores; has an end set at the upper cover 11 and another end set at the lower cover 12; and, along a cross-section radial, is divided into an adsorption area 21, a transition area 22, and a dewater area 23. The lower cover 12 has three ends each of which has a screw 13. The screw 13 is inserted into the upper cover 11 and is fixed by fastening nuts 14, springs 15, and washers 16 at two ends. The desiccant wheel 2 is driven by a motor to rotate at a fixed speed and is connected with the shell body 1 through tubes to continually repeat a process of adsorbing, transiting, and regenerating. Thus, a novel device of high-efficiency desiccant wheel is obtained.

Figure 2:
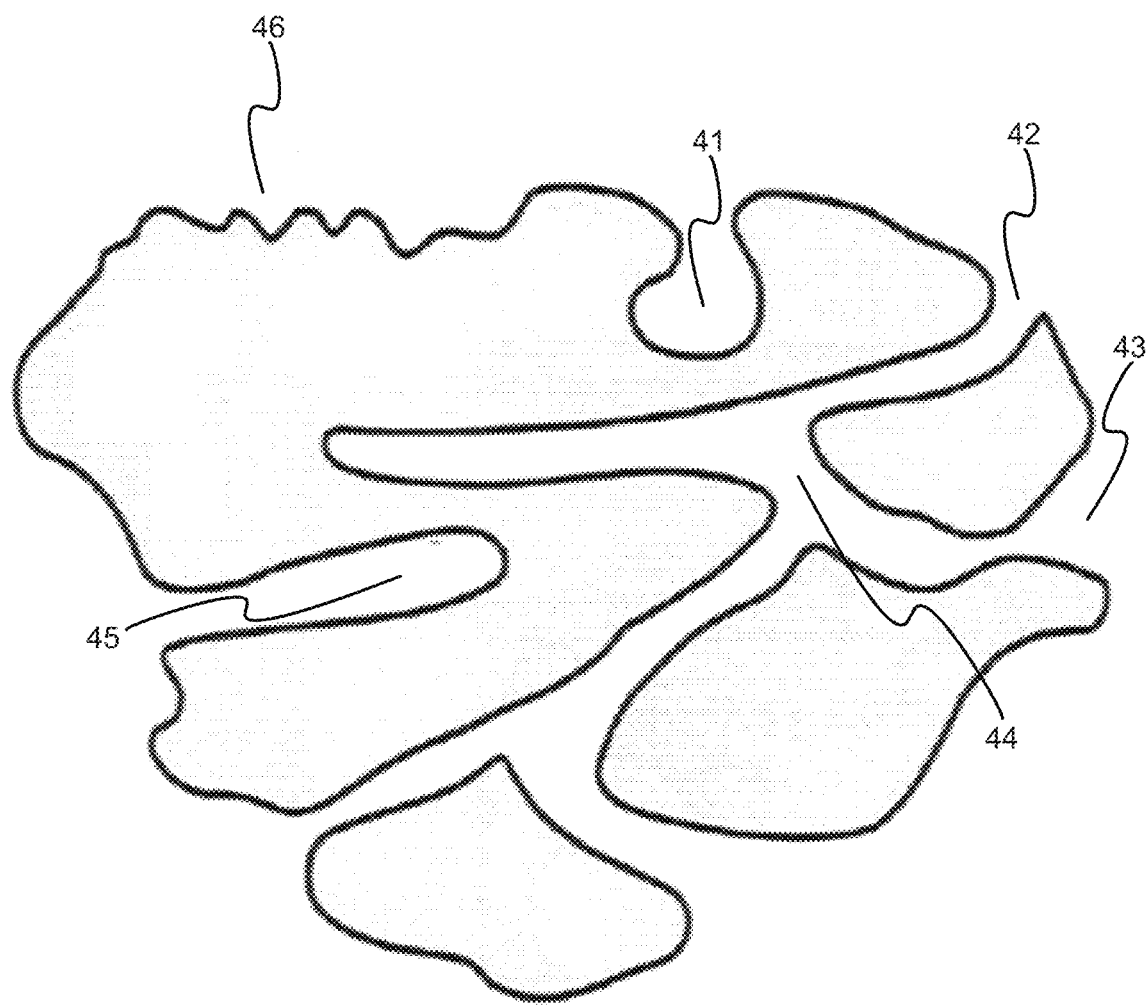
FIG. 2 is the view showing the shapes of the pores.
Figure 3:
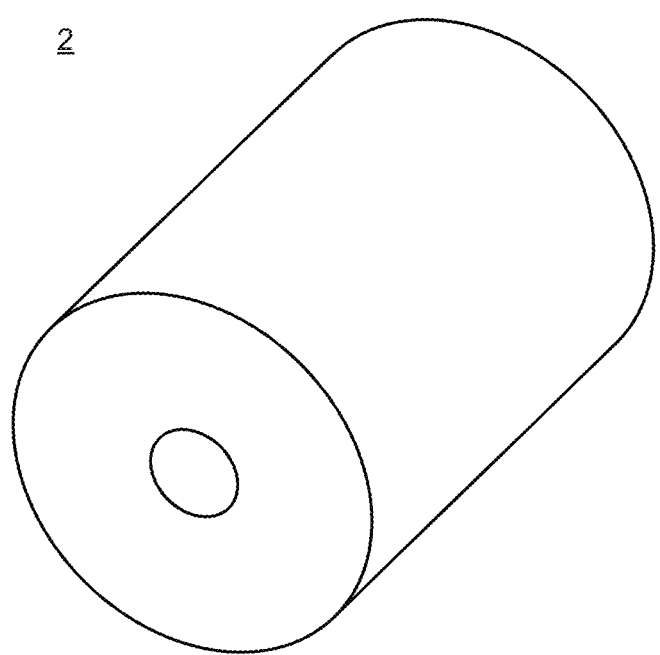
FIG. 3 is the view showing the complete concentric cylinder.
Figure 4:
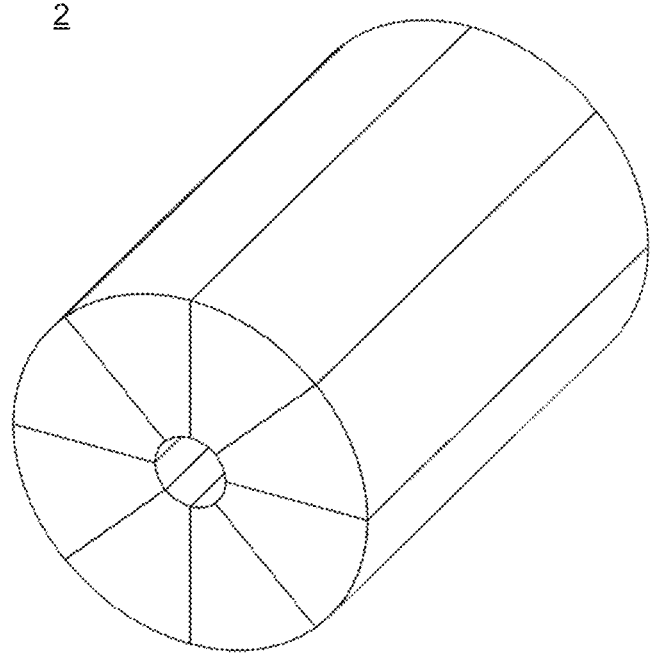
FIG. 4 is the view showing the concentric cylinder comprising equal sectors.
Figure 5:
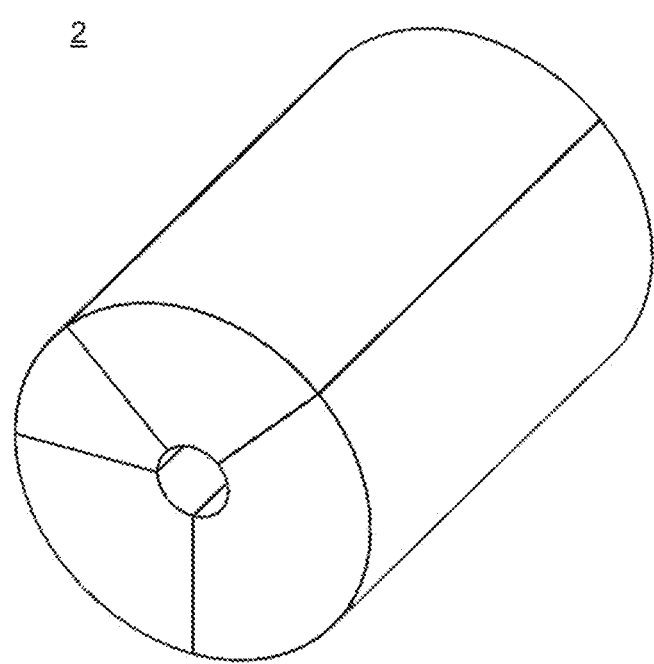
FIG. 5 is the view showing the concentric cylinder comprising unequal sectors.

On using the present invention, the desiccant wheel 2 has a structure of 3D inter-connected pores. The structure is an aerogel structure, a foam structure, a sponge structure, or a honeycomb structure, which is more efficient than the through-hole honeycomb found in the international market. As an example, the device of high-efficiency desiccant wheel according to the present invention has various types of pores as shown in FIG. 2, including open holes 41,42, 43,44,45, blind holes 41,45, through holes 44 and holes with rough and rugged surface 46. The body of the desiccant wheel 2 is made of aluminum oxide, zirconium oxide, chromium oxide, silicon oxide, silicon carbide, or silicon nitride. Furthermore, the desiccant wheel 2 of the present invention may use alumina as a resource recycled from aluminum dross through regeneration without import or mining. The cost becomes competitive and environmental pollution of waste can be can reduced, which is in line with the green manufacturing principle of circular economy. Moreover, the whole body of the desiccant wheel 2 is concentric cylindrical, which can be a whole concentric cylinder as shown in FIG. 3; a concentric cylinder comprising equal sectors as shown in FIG. 4; or a concentric cylinder comprising unequal sectors as shown in FIG. 5. The concentric cylinder comprising equal or unequal sectors has each individual sector separated with a separating unit (not shown in the figures). The separating unit is a film sheet, a fiber sheet, a cloth sheet, a plastic sheet, or a metal sheet for preventing the air in the pores of the equal or unequal sectors from flowing to other sectors. Nevertheless, the whole surface of the desiccant wheel 2 is circumferentially covered with a film sheet, a fiber sheet, a cloth sheet, a plastic sheet, or a metal sheet for preventing the air in the concentric cylinder from leaking out of the circumferential surface.

Figure 6:
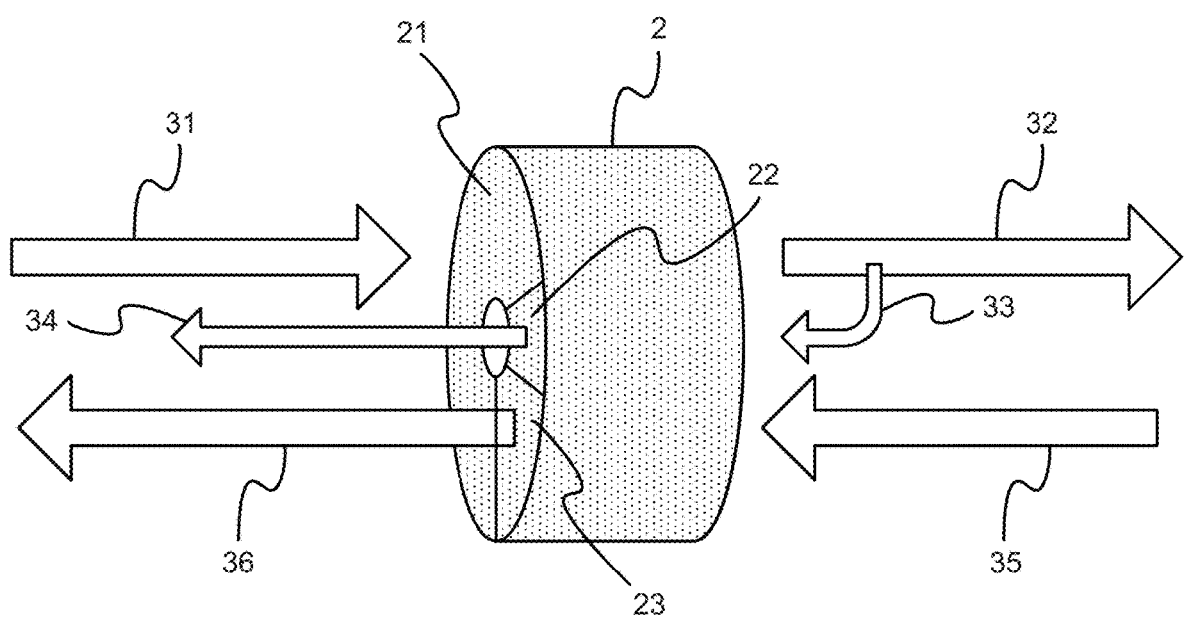
FIG. 6 is the view showing the application.

An application of a device of high-efficiency desiccant wheel according the present invention is shown in FIG. 6. The cross-section of a desiccant wheel 2 are divided into three areas: an adsorption area 21, a transition area 22, and a dewater area 23 along radial. On using, the desiccant wheel 2 dries a low-temperature humid air flow 31 having a temperature of 5~35 degrees Celsius (° C.) while a motor 24 rotates a gear 241 accompanied on its shaft to drive a synchronizing teeth rack 243 by a synchronizing wheel belt 242 for rotating the desiccant wheel 2 at a fixed speed. The low-temperature humid air flow 31 enters into the adsorption area 21 of the desiccant wheel 2 through a low-temperature humid air inlet 121 to adsorb water vapor by the body of the desiccant wheel 2 or a surface adsorbent. After a dry air flow with a dew-point temperature of −70~20° C. is thus obtained, the flow is outputted from a dry air outlet 112. A portion of the dry air flow 33 is shunted at an upper cover 11 to enter into a transition area 22 of the desiccant wheel 2 to desorb a portion of water on the desiccant wheel 2. After forming a low-temperature humid air flow 34, the flow is outputted from a low-temperature humid air outlet 122. Then, a high-temperature dry air flow 35 having a temperature of 40~200° C. enters into the dewater area 23 of the desiccant wheel 2 through a high-temperature dry air inlet 111 to desorb most portion of water on the desiccant wheel 2 for forming a high-temperature humid air flow 36. At last, the flow is outputted from a high-temperature humid air outlet 123. Since the desiccant wheel 2 of the present invention rotates at the fixed speed, the desiccant wheel 2 continually repeats a process of adsorbing, transiting, and regenerating.

The body of the desiccant wheel according to the present invention has a structure of 3D inter-connected pores, which is different from conventional desiccant wheel. Furthermore, a complete module of the desiccant wheel is assembled with coordinated components to be attached to a drying equipment for application. The use of the present invention focuses on heat-sensitive material, like food, plastics, semiconductor, sludge, etc. for drying. No physical or chemical change would happen; drying efficiency is also improved; size is reduced; power consumption is lowered; and a help in carbon reduction is achieved for industry. The device of high-efficiency desiccant wheel according to the present invention has the following advantages for solving the problems of conventional desiccant wheel:

1. The flow channels of the desiccant wheel are not straight lines, so that the contact areas for air flows are large.

2. The air for regenerating the desiccant wheel has a low temperature, below 80° C., so that energy efficient is very high and lives of components are long.

3. The body of the desiccant wheel adsorbs water, so that the shedding of adsorbent does not happen.

4. The body of the desiccant wheel is robust and resistant to abrasion and collision.

To sum up, the present invention is a high-efficiency desiccant wheel, where a desiccant wheel rotatable is provided; through the body of the wheel or a surface adsorbent, water vapor in humid air flow passing through the desiccant wheel is adsorbed; in the meantime, by passing another high-temperature air flow through the desiccant wheel, the body or surface coating of the wheel is regenerated with moisture removed; thereby, drying can be carried out without causing physical or chemical change to heat-sensitive material; and the present invention further improves drying efficiency, reduces size, lowers power consumption, and helps in carbon reduction for industry.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A device of high-efficiency desiccant wheel, comprising a shell body, wherein said shell body has an upper cover and a lower cover; said upper cover has a high-temperature dry air inlet and a dry air outlet; and said lower cover has a low-temperature humid air inlet, a low-temperature humid air outlet, and a high-temperature humid air outlet; and a desiccant wheel, wherein said desiccant wheel has a body of concentric cylinder, and a structure of pores three-dimensionally inter-connected; said desiccant wheel has an end at said upper cover and another end at said lower cover; and, along a cross-section radial, said desiccant wheel is divided into an adsorption area, a transition area, and a dewater area, wherein said lower cover has three ends each of which has a screw; said screw is inserted into said upper cover and is fixed by fastening nuts, springs, and washers at two ends of said screw; and said desiccant wheel is driven by a motor to rotate at a fixed speed and is connected with said shell body through tubes;

wherein, after a low-temperature humid air flow enters into said adsorption area through said low-temperature humid air inlet to adsorb water vapor to obtain a dry air flow, said dry air flow is outputted through said dry air outlet; then, after a portion of said dry air flow is shunted at said upper cover to enter into said transition area to desorb a portion of water on said desiccant wheel to obtain a low-temperature humid air flow, said low-temperature humid air flow is outputted from said low-temperature humid air outlet; then, a high-temperature dry air flow enters into said dewater area through said high-temperature dry air inlet to desorb most of a portion of water on said desiccant wheel to obtain a high-temperature humid air flow; and, then, said high-temperature humid air flow is outputted through said high-temperature humid air outlet; and wherein said desiccant wheel thus rotates at said fixed speed to continually repeat a process of adsorbing, transiting, and regenerating.

2. The device according to claim 1, wherein said structure of pores is selected from a group consisting of an aerogel structure, a foam structure, a sponge structure, and a honeycomb structure.

3. The device according to claim 1, wherein said body of said desiccant wheel is of a material selected from a group consisting of aluminum oxide, zirconium oxide, chromium oxide, silicon oxide, silicon carbide, and silicon nitride.

4. The device according to claim 1, wherein each of said pores is selected from a group consisting of an open hole, a blind hole, a through hole and a hole with rough and rugged surface.

5. The device according to claim 1, wherein said body of said desiccant wheel has a shape selected from a group consisting of a whole concentric cylinder; a concentric cylinder comprising equal sectors; and a concentric cylinder comprising unequal sectors.

6. The device according to claim 5, wherein said concentric cylinder comprising equal sectors and said concentric cylinder comprising unequal sectors have each individual sector separated with a separating unit.

7. The device according to claim 6, wherein said separating unit is selected from a group consisting of a film sheet, a fiber sheet, a cloth sheet, a plastic sheet, and a metal sheet.

8. The device according to claim 5, wherein a separating unit covers the whole surface of said desiccant wheel circumferentially.

9. The device according to claim 8, wherein said separating unit is selected from a group consisting of a film sheet, a fiber sheet, a cloth sheet, a plastic sheet, and a metal sheet.

10. The device according to claim 1, wherein said motor has a shaft accompanied with a gear; said gear drives a synchronizing teeth rack by a synchronizing wheel belt to rotate said desiccant wheel at said fixed speed.

11. The device according to claim 1, wherein said low-temperature humid air flow has a temperature of 5~35 degrees Celsius (° C.); said high-temperature dry air flow has a temperature of 40~200° C.; and said dry air flow has a dew-point temperature of −70~20° C.

* * * * *